United States Patent
Guenach et al.

(10) Patent No.: US 8,571,184 B2
(45) Date of Patent: Oct. 29, 2013

(54) DEVICE AND ASSOCIATED METHOD FOR MEASURING CROSSTALK

(75) Inventors: Mamoun Guenach, Machelen (BE); Jochen Maes, Veerle (BE); Michael Peeters, Lint (BE); Jan Sylvia Verlinden, Deurne (BE)

(73) Assignee: Alcatel Lucent, Paris (FR)

( * ) Notice: Subject to any disclaimer, the term of this patent is extended or adjusted under 35 U.S.C. 154(b) by 1428 days.

(21) Appl. No.: 12/184,730

(22) Filed: Aug. 1, 2008

(65) Prior Publication Data

US 2009/0041203 A1 Feb. 12, 2009

(30) Foreign Application Priority Data

Aug. 10, 2007 (EP) .................................. 07290999

(51) Int. Cl.
*H04M 3/30* (2006.01)
(52) U.S. Cl.
USPC ........................... 379/22.02; 379/417
(58) Field of Classification Search
USPC ............... 379/22.02, 417, 1.04, 27.01, 27.02, 379/27.07, 399.01, 416, 414; 370/201
See application file for complete search history.

(56) References Cited

U.S. PATENT DOCUMENTS

| | | | |
|---|---|---|---|
| 6,647,067 B1 * | 11/2003 | Hjelm et al. | 375/260 |
| 2003/0112967 A1 * | 6/2003 | Hausman et al. | 379/417 |
| 2004/0095921 A1 | 5/2004 | Kerpez | |
| 2006/0039454 A1 * | 2/2006 | Cioffi | 375/222 |
| 2006/0153106 A1 * | 7/2006 | Laakso et al. | 370/282 |
| 2006/0274893 A1 | 12/2006 | Cioffi et al. | |
| 2007/0047733 A1 * | 3/2007 | Bremer et al. | 379/416 |

FOREIGN PATENT DOCUMENTS

| | | |
|---|---|---|
| EP | 1283655 A1 | 2/2003 |
| EP | 1641173 A1 | 3/2006 |

OTHER PUBLICATIONS

ITU-T Recommendation G.992.1—Jun. 1999—Aysmmetric digital subscriber line (ADSL) transceivers.
ITU-T Recommendation G.992.3—Jul. 2002 Asymmetric digital subscriber line transceivers 2 (ADSL2).

* cited by examiner

*Primary Examiner* — Md S Elahee
*Assistant Examiner* — Akelaw Teshale
(74) *Attorney, Agent, or Firm* — Harness, Dickey & Pierce

(57) ABSTRACT

The present invention relates to a device (108, 109, 110) comprising an interface to at least one active subscriber line (112) and an interface to at least one inactive subscriber line (111). The device (108, 109, 110) comprises means for transmitting a first signal on the inactive subscriber line (111) and means for synchronously measuring crosstalk (130; 201, 203, 205, 207) induced into the active subscriber line (112) by transmitting the first signal on the inactive subscriber line (111).

8 Claims, 3 Drawing Sheets

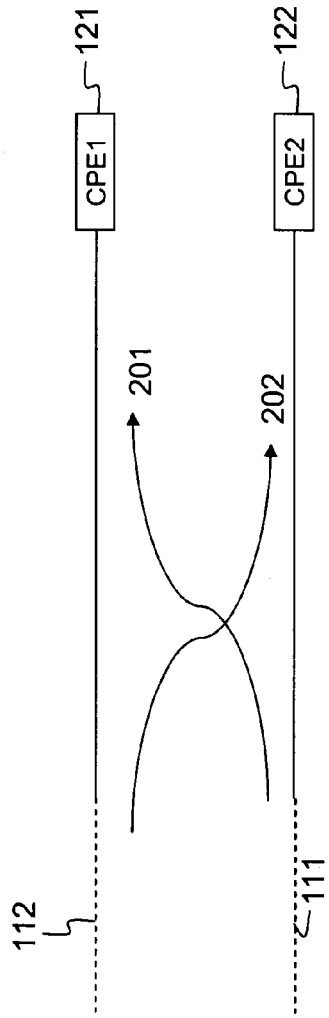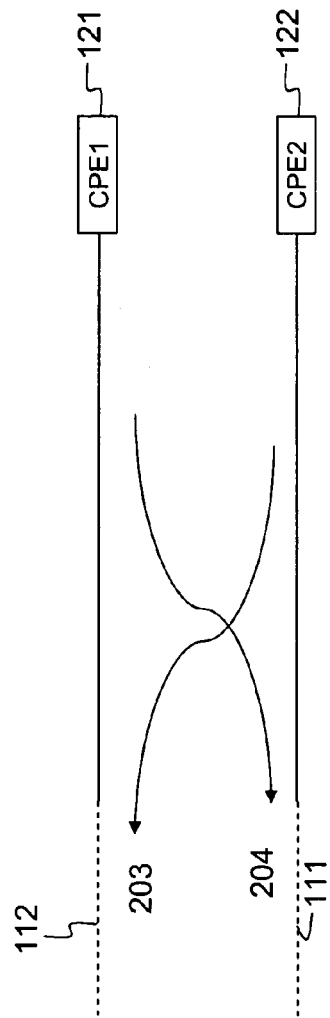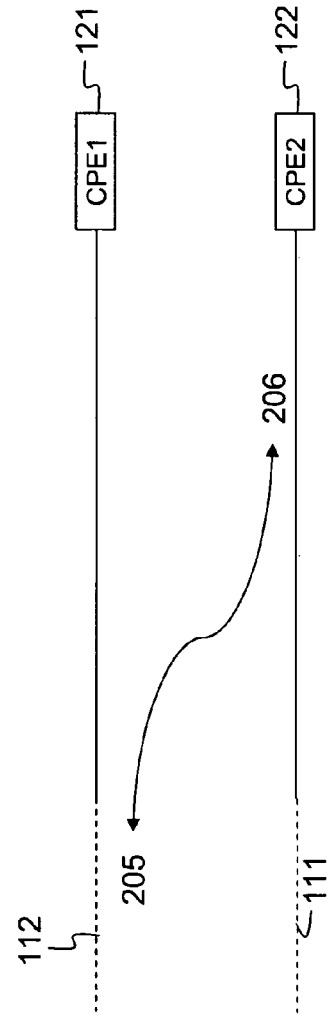

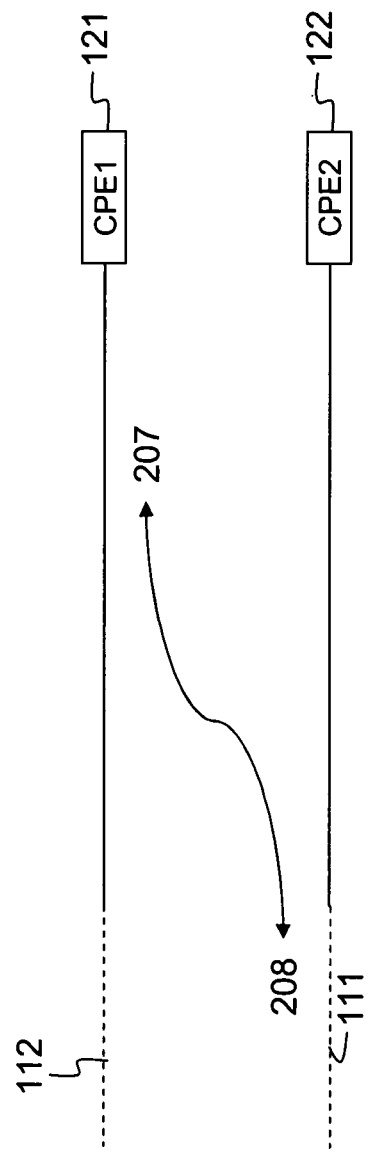

DEVICE AND ASSOCIATED METHOD FOR MEASURING CROSSTALK

FIELD OF THE INVENTION

The present invention generally relates to determining crosstalk into active communication lines and more in particular to determining crosstalk between subscriber lines in scenario's where an upcoming subscriber line is involved.

BACKGROUND OF THE INVENTION

Transmission of data at high speeds, for instance in Asymmetric Digital Subscriber Line (ADSL) or Very high-speed Digital Subscriber Line (VDSL) networks, commonly referred to as xDSL networks is subject to errors injected by external sources. One particular problem is the influence of crosstalk between various subscriber lines within close vicinity. Crosstalk is the effect whereby a first subscriber line induces signals on a second, different subscriber line which act as noise on that second subscriber line. Such effects are especially noticed when multiple subscriber lines form part of the same cable or cable binder or when they are terminated close to each other, for instance in a Digital Subscriber Line Access Multiplexer (DSLAM) where multiple subscriber lines are terminated on the same board.

Noise effects can be dealt with in various ways, for instance the use of error correction codes can reduce the effects of noise. Such error correction codes, for instance Reed-Solomon, consist of additional bits which are added to the transmitted user data and which can be used by a receiver to detect and eventually correct corrupted data. Generally error codes can only recover a limited number of errors in data but are able to detect more errors. In such case, the receiver may rely on other mechanisms to obtain corrected data, for instance retransmission. Retransmission can be implemented explicitly, whereby a receiver asks the transmitter to resend a piece of data, or implicitly whereby the transmitter waits for a confirmation of the receipt of the correct data and if no confirmation is received, the transmitter will automatically retransmit the data. However error corrections codes and retransmission occupy additional bandwidth, hence reducing the bandwidth available for user data transmission. As such, these error codes reduce the effective speed of high bandwidth connections such as xDSL links. This could be acceptable to cope with impulse noise errors but may become a problem for long term noise effects such as upcoming subscriber lines which may take some time to initialize and establish a connection, and which may permanently induce crosstalk once they are active.

To improve this situation and thus reduce the corrections that are needed, solutions which reduce the effects of noise and more in particular crosstalk are used. Seamless Rate Adaptation (SRA) is a solution which aims at reducing the influence of crosstalk on active lines when a subscriber line is activated. SRA is described in chapter 10.2 of the ITU-T Standard Specification G.992.3 entitled "Asymmetric Digital Subscriber Line transceivers 2 (ADSL2)". The SRA solution reduces the upstream and downstream bit rate on active subscriber lines in order to make them less sensitive to crosstalk. However, SRA requires communication between the endpoints of the subscriber line to set the low bit rates in upstream and downstream direction. Such communication runs over the same subscriber line as the user data and is thus subject to the same noise effects and error injection. In addition, SRA might reduce the bit rates on active subscriber lines. This means that SRA unavoidably might affect the service of active subscriber lines when a subscriber line is activated.

Similar to SRA is Dynamic Rate Adaptation (DRA) which is described in detail in Appendix II to the ITU-T Standard Specification G.992.1 entitled "Asymmetric Digital Subscriber Line (ADSL) transceivers". Therein it is mentioned that DRA is designed to cancel impulse noise effects that could cause a short term service interruption of a few tens of milliseconds. Thus, DRA is not designed to deal with long term noise effects which may for instance arise during the initialization of a subscriber line.

Another solution to overcome crosstalk effects during the initialization of a subscriber line is to apply artificial noise, for instance as described in European Patent Application EP 1 641 173 titled "Multi-Carrier modem transmitter with controlled transmit signal quality degradation for improving stability of operation." or virtual noise on active subscriber lines. This solution consists of injecting noise on active lines representative for the noise of external sources onto the subscriber line. The amount of noise that is injected is an estimation of the noise effects which will be induced on the active subscriber line. However, such estimations are difficult to make. For instance, impulse noise may temporarily induce more noise on the active subscriber line. In addition, artificial or virtual noise reduces the amount of available bandwidth on the subscriber line during times of low noise and may be too drastic to be a viable or acceptable reduction for long term connections.

An example of existing solutions is disclosed in Cioffi et al. US20060274893 titled "DSL system training". It discloses a system to train new subscriber lines such that the training is non-disruptive to other subscriber lines and which is based on reducing power and measuring crosstalk levels when a new line is inserted. In this particular example the joining subscriber line is already transmitting data (i.e. active) which means that some pre-compensation is required to avoid disturbing other subscriber lines. This pre-compensation requires configuration of the other subscriber lines which may delay the initialization of the joining subscriber line and which requires an a priori knowledge or estimation of crosstalk effects. The transmit power will be gradually increased in a process of successive retrains. Therefore, several service interruptions can occur and the desired data rate may only be achieved after a lengthy procedure.

It is an object of the present invention to provide a device and method for enabling the a priori estimation and mitigation of the future effects of crosstalk induced by an inactive subscriber line which overcomes the shortcomings of the above described prior art solutions. It is another object of the present invention to enable crosstalk compensation mechanisms to operate in scenario's where the activation of an inactive subscriber line is involved, i.e. enabling efficient long-term crosstalk compensation mechanisms with minimum impact on the effective bandwidth and speeds on already active subscriber lines. It is another object of the present invention to enable full speed activation of an upcoming inactive subscriber line.

SUMMARY OF THE INVENTION

The objectives of the present invention are realized and the drawbacks of the prior art solutions are overcome by a device comprising an interface to at least one active subscriber line and an interface to at least one inactive subscriber line, characterized in that the device comprises means for transmitting a first signal on the inactive subscriber line and means for synchronously measuring crosstalk induced into the active subscriber line by transmitting the first signal on the inactive subscriber line.

Indeed, when transmitting a signal on the inactive subscriber line, the device is able to measure the crosstalk of the inactive subscriber line on the active subscriber line. The device is aware of the transmission of the first signal on the inactive subscriber line and can thus synchronously measure changes on the active subscriber line, these changes being indicative for the induced crosstalk or the device can measure crosstalk on the active subscriber line based on the transmitted signal. Of course, the device does not need to use the measured changes in crosstalk synchronously or simultaneously with transmitting the first signal. The measurement may for instance be stored for a length of time before the measurement is used by the device or by another device, module or node. For instance, the measured crosstalk information may be requested by a network analyzer or module of a DSLAM several seconds or even minutes after the actual measurement. Generally the device will monitor the changes in crosstalk on more than one active subscriber line, for instance on all active subscriber lines in the same binder or connected to the same terminating equipment such as a DSLAM.

Active subscriber lines are subscriber lines which are initialized and thus able to transport user data between two endpoints such as a DSLAM and an xDSL modem. Lines which are currently initializing may also considered to be active subscriber lines because there is transport of data or signals on these subscriber lines which may be impaired by crosstalk induced by other lines. The inactive subscriber lines are subscriber lines for which the terminating equipment on one side is disconnected or turned off or whereby the initialization is intentionally or unintentionally delayed. In the case of xDSL, an active subscriber line is a subscriber line between a DSLAM and Customer Premises Equipment (CPE) which is initializing to establish an xDSL connection there between, or which have an established connection. An inactive subscriber line is a line whereby the CPE is disconnected or off or whereby the initialization is intentionally or unintentionally delayed.

The first signal transmitted on the inactive subscriber line can be any signal which induces crosstalk on the active subscriber lines. However it is most beneficial to use a signal which represents a worst case scenario. The measurement of crosstalk in a worst case scenario provides valuable information which can be used to tune active subscriber lines to an upcoming subscriber line. The transmission of the first signal is not necessarily done immediately before the inactive subscriber line will be activated. The first signal is not necessarily the first signal in time that is transmitted on the subscriber line. For instance, the first signal may be transmitted after a handshake signal. Of course the first signal may be the first signal in time to be transmitted on the inactive subscriber line.

The advantage of using a device according to the present invention is that information related to crosstalk is measured without significantly affecting active subscriber lines. Both user termination equipment such as CPE and operator termination equipment such as a DSLAM can measure the crosstalk induced by the inactive subscriber line from the first signal. This means that the equipment is aware of how the activation of the inactive subscriber line will affect the existing subscriber lines. This information can for instance be used to calculate a pre-compensation matrix. This matrix is used by active subscriber lines to compensate the effects of the crosstalk before they arise and thus should be calculated as accurately as possible before the effects arise. Similarly, the information can be used by network management nodes, such as a Network Analyzer, in crosstalk avoidance algorithms which enables line management on multiple subscriber lines and thus reduces the influence of crosstalk. For example the bitloading could be reduced in a controlled way before activation of the inactive line by for example changing the virtual or artificial noise settings rather than in an uncontrolled way during activation of the inactive line. In conclusion, measuring the crosstalk effects of an inactive subscriber line on active subscriber lines before the inactive subscriber lines are activated provides a strong estimation of the crosstalk effects that can be expected during and after activation.

Optionally, the device according to the present invention may be characterized in that the means for transmitting a signal are adapted to transmit a low-power signal.

A low-power signal is a signal which is substantially lower in transmit power than the transmit power during initialization of a subscriber line or during normal operation of a subscriber line. Using a low-power signal ensures that measuring crosstalk induced by the inactive subscriber line onto the active subscriber line does not interrupt service on the active subscriber lines. For instance a full power signal may influence active subscriber lines to such extent that services thereon are interrupted or delayed, e.g. retransmissions may be needed to overcome the impulse noise generated by the measurement. For services like file transfer, this is not a significant problem as they can deal with retransmissions or error corrections without a user noticing, however streaming services may show visible undesirable artefacts in the image.

The low-power signal may vary during the measurement. For instance the measurement may actually consist of multiple signals whereby the transmit power of each signal is increased or whereby the transmit power is based on the measurement after the previous transmitted signal.

One example of a low-power signal is a tone chosen according to the formula $\min_k(N_k - C_{k,K})$ wherein for an active subscriber line k the parameter $N_k$ indicates the noise (including interference) level at the receiver expressed in dBm/Hz and $C_{k,K}$ is the expected crosstalk amplitude from the inactive subscriber line K into active subscriber line k expressed in dB. This formula ensures that none of the active subscriber lines are impacted by more than 3 dB and thus that there is no or almost no influence on active subscriber lines due to the measurement. This is even more so if a typical noise margin of 6 dB is taken into account. The expected crosstalk amplitude $C_{k,K}$ can be found in a database, estimated based on line length, estimated based on prior measurements, etc. A particular numeric example shows the low impact on active subscriber lines by using the above formula. If the receive noise $N_k$ of the active subscriber line is $-130$ dBm/Hz and the estimated crosstalk amplitude $C_{k,K}$ is $-50$ dB, then a transmit signal of $-80$ dBm/Hz will have a 3 dB impact on the active subscriber line.

Optionally, the device according to the present invention may further comprise means for measuring crosstalk induced into the inactive subscriber line by transmission of at least a second signal on the at least one active subscriber line. Crosstalk works in both directions, i.e. the active subscriber line also induces crosstalk on the inactive subscriber line. Therefore measuring the crosstalk on the inactive subscriber line from the active subscriber lines may provide additional information. This information can be used, in combination with the crosstalk information related to the crosstalk from the inactive subscriber line onto the active subscriber line, to determine how the conditions for all subscriber lines will change when a particular inactive subscriber line is activated. The information related to the crosstalk from active subscriber lines onto the inactive subscriber line can be measured by listening on an inactive subscriber line. Since the line is inactive, there should be no signal on the subscriber line. Thus, any signal which is detected on an inactive subscriber line is actually an external influence such as crosstalk from other lines or induced noise from environmental effects.

The influence from other active subscriber lines can be measured based on the second signal running thereon. This second signal can be a test signal which is sent on top of the regular data transmission or may be the regular data transmission itself. Generally, each active subscriber line may influence an inactive subscriber line and as such transports a second signal. In addition to the regular data transmission and a test signal, the second signal may also be the communication between the endpoints to initialize a connection between the endpoints.

Optionally, the device according to the present invention may further comprise means for estimating crosstalk induced into the inactive subscriber line based on the crosstalk induced into the active subscriber line by the inactive subscriber line.

An alternative way of measuring the crosstalk from active subscriber lines onto an inactive subscriber line is by applying reciprocity to estimate the crosstalk. Once the crosstalk induced by the inactive subscriber line into the active subscriber line is determined, the device can apply reciprocity to estimate the crosstalk induced by the active subscriber line into the inactive subscriber line.

The advantage of this solution is that only one measurement of crosstalk is required. Thus no additional measurements are required which reduces the time and complexity of the crosstalk estimation. It further also provides crosstalk information which can be used by crosstalk avoidance or compensation mechanisms which allow an initialization of new lines at higher data rate.

Optionally, the device according to the present invention may further comprise means for updating information related to the crosstalk induced by the inactive subscriber line into the active subscriber line or vice versa over time.

Crosstalk between various subscriber lines varies slowly over time if conditions remain the same. For instance, if data rate on the lines is unchanged, the crosstalk induction will remain relatively unchanged as well. Therefore, there is no need for constant monitoring of crosstalk influences from inactive subscriber lines to active subscriber lines. Thus, updating the information from time to time is sufficient to keep the available information up to date and ready for use by crosstalk compensation or avoidance systems. The information can be updated at regular intervals, for instance every minute, five minutes, twenty minutes, etc, or at more or less random intervals, for instance a base interval of ten minutes where each time up to sixty seconds is added or subtracted resulting in an interval between nine and eleven minutes.

Optionally, the device according to the present invention may be integrated in a Digital Subscriber Line Access Multiplexer (DSLAM).

A DSLAM terminates a number of subscriber lines at the side of the operator in the Central Office (CO). Therefore, a DSLAM is able to interact with a number of subscriber lines which can be active or inactive. In addition, by terminating a number of subscriber lines the DSLAM creates a concentration of subscriber lines and thus becomes a physical location where crosstalk is induced. Additionally, the DSLAM is involved in the initialization of inactive subscriber lines and performs crosstalk measurements on active or inactive lines to monitor changes thereon. As such, integration of the device according to the present invention into the DSLAM provides various advantages without a lot of modifications to existing equipment. The integration of the device into the DSLAM provides an interface to all the available subscriber lines making the device operation possible. In addition, the device can easily provide the measurements to the DSLAM which means that the DSLAM can use the measurements in the initialization of other subscriber lines.

Optionally, the device according to claim the present invention may be integrated in a Network Analyzer.

The network analyzer has knowledge of the entire network or a part thereof. This may be beneficial to provide crosstalk measurements to various nodes in the network. For instance two DSLAMs located close to each other may benefit from measurements performed by the other DSLAM. In addition, subscriber lines can physically be bundled or virtually. A network analyzer may have knowledge related to bundling of subscriber lines which is not available in a DSLAM. A network analyzer may further provide algorithms to avoid crosstalk effects in the network and thus may benefit from the crosstalk measurements from an inactive subscriber line to an active subscriber line or from an active line into an inactive line.

The present invention further related to a method for use in a device comprising an interface to at least one active subscriber line and an interface to at least one inactive subscriber line, characterized in that the method comprises the step of transmitting a first signal on the inactive subscriber line and the step of synchronously measuring crosstalk induced into the active subscriber line by transmitting the first signal on the inactive subscriber line.

BRIEF DESCRIPTION OF THE DRAWINGS

FIG. 2 illustrates use cases of reciprocity to estimate crosstalk between two subscriber lines according to one embodiment of the present invention.

DETAILED DESCRIPTION OF EMBODIMENT(S)

Figure 1:
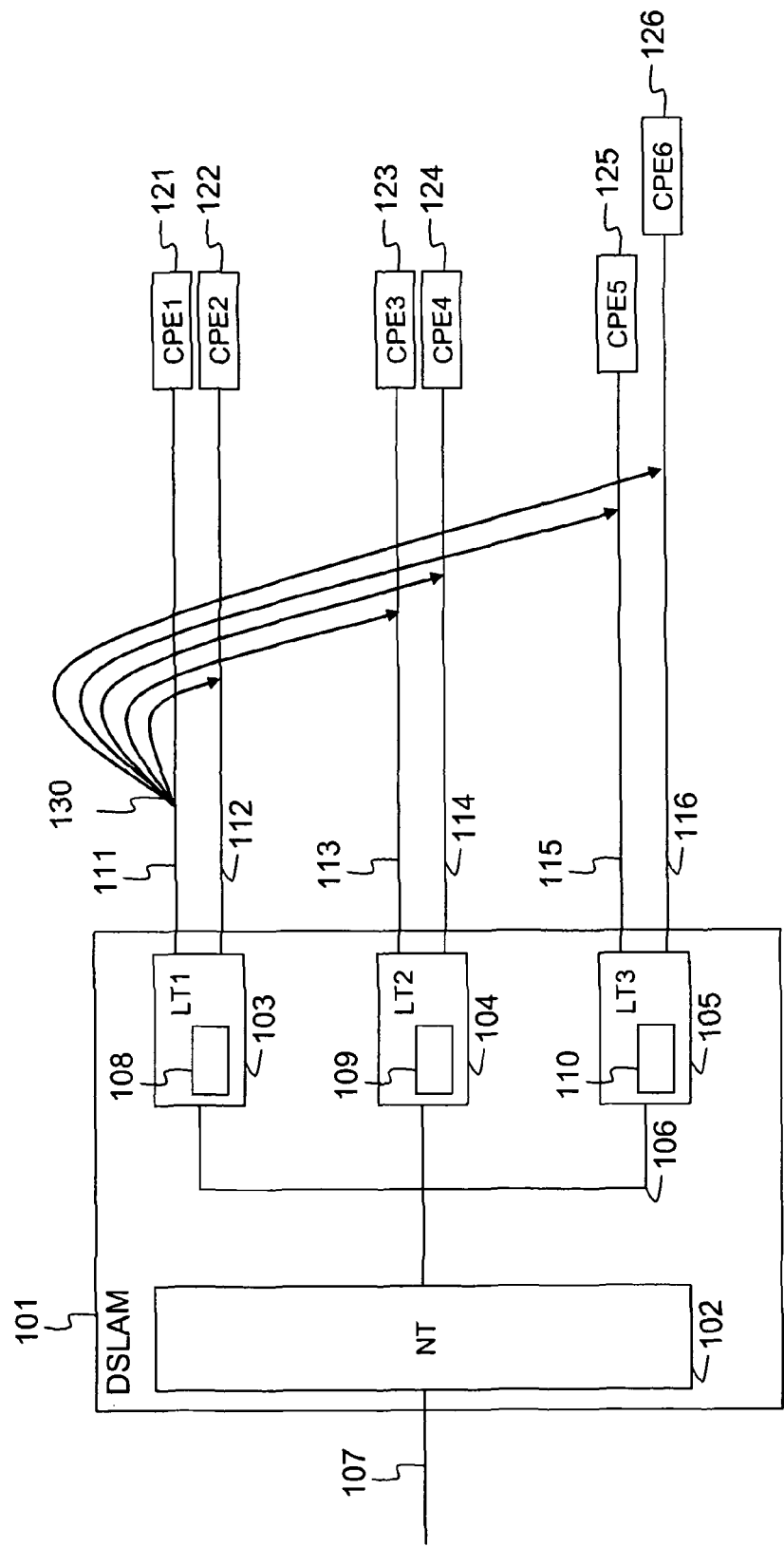
FIG. 1 illustrates an overview of a DSL network wherein the DSLAM is equipped with an embodiment of the device according to the present invention.

FIG. 1 illustrates an overview of a DSL network with a Digital Subscriber Line Access Multiplexer (DSLAM) 101 and multiple pieces of Customer Premises Equipment (CPE) CPE1 to CPE6, respectively numbered 121 to 126. The DSLAM 101 is made up out of a network termination (NT) 102, line termination boards (LT) LT1 to LT3, respectively numbered 103 to 105. Each line termination board 103 to 105 is connected to two subscriber lines 111 to 116, which are in turn connected to CPE1 to CPE6. Each LT 103 to 105 is further connected to the network termination 102 by means of a bus 106. The network termination 102 is also connected to an upstream link 107 which connects DSLAM 101 with the edge network or aggregation network of the DSL operator whereto DSLAM 101 belongs.

Each LT 103 to 105 is provided with an embodiment of the device according to the present invention 108 to 110 to measure crosstalk between multiple subscriber lines. For instance, in this particular example, LT1 103 is connected to subscriber lines 111 and 112 which respectively are connected to CPE1 121 and CPE2 122. In this particular example, CPE1 is switched off which means that subscriber line 111 is inactive and thus does not inject crosstalk on subscriber line 112. It is assumed that in this particular example, the devices 108 to 110 measure the crosstalk on inactive subscriber lines every 20 minutes. Thus, for this example the device 108 will transmit a signal on subscriber line 111 every 20 minutes and measure the crosstalk on subscriber line 112 simultaneously. In addition to this measurement, the device 108 may also organize measurements by device 109 and/or device 110. This means that device 108 can notify devices 109 and/or 110 of the signal that is about to be sent and request a measurement of changes in crosstalk on the active lines connected to LT2 104 and/or LT3 105. The crosstalk induced by inactive subscribe line 111 on subscriber lines 112 to 116, which are all assumed to be active in this particular example, is indicated by arrows 130. This ensures that each LT in the DSLAM 101 is aware of crosstalk effects from inactive subscriber line 111 and can take this information into account for crosstalk avoidance or compensation mechanisms.

Of course, other embodiments may have more than six CPE's connected to a single DSLAM. Typically a line termination board will support 48, 72, 96 or more subscriber lines simultaneously. In addition, a DSLAM may support more than one line termination board. Each device according to the present invention may be able to measure on more than two subscriber lines. It should also be noted that the device according to the present invention may be a single module in the DSLAM which is connected to the line termination boards, for instance through the bus 106. Such module may be able to instruct an LT to transmit a signal on a particular subscriber line and that LT and/or other LT's to measure crosstalk on active subscriber lines. It should also be noted that the device according to the present invention may be a module on the line termination board.

Although not illustrated in FIG. 1, the device may further also measure crosstalk from the active subscriber lines, in this example 112 to 116, to the inactive subscriber line 111. It may perform such measurement by listening on the inactive subscriber line 111 or by calculating an estimation based on the measured crosstalk from the inactive subscriber line to the active subscriber lines.

FIG. 2 illustrates two subscriber lines 111 and 112 connected to CPE1 121 and CPE2 122 respectively. It is assumed that subscriber line 111 is an inactive subscriber line and that subscriber line 112 is active. The figure is made up out of four parts, wherein part a. illustrates the downstream crosstalk between the two subscriber lines 111 and 112. The downstream crosstalk 201 from the inactive subscriber line 111 induced on the active subscriber line 112 is used to estimate the downstream crosstalk 202 induced by active subscriber line 112 on inactive subscriber line 111. FIG. 2 further shows in part b. the upstream crosstalk 203 induced by the inactive subscriber line 111 on the active subscriber line 112 and the upstream crosstalk 204 induced by the active subscriber line 112 on the inactive subscriber line 111 where crosstalk 203 is estimated based on crosstalk 204 measurement or vice versa. FIG. 2 illustrates in part c. upstream crosstalk 205 induced by the inactive subscriber line 111 into the active subscriber line 112 and the downstream crosstalk 206 induced by the active subscriber line 112 into the inactive subscriber line 111, whereby crosstalk 206 is estimated based on crosstalk 205 or vice versa. Finally, FIG. 2 illustrates in part d. downstream crosstalk 207 induced by the inactive subscriber line 111 into the active subscriber line 112 and the upstream crosstalk 208 induced by the active subscriber line 112 into the inactive subscriber line 111, whereby crosstalk 208 is estimated based on crosstalk 207 or vice versa. It should be noted that although several estimations of crosstalk based on reciprocity are illustrated, it may be possible to perform more combinations than those shown.

In one particular example, the estimation can be made by the assumption that crosstalk induced by the inactive line on the active line is equal to or approximates the crosstalk induced by an active line on the inactive line. In such case, the estimation for crosstalk 202 can be that it is equal to crosstalk 201. However, more complex functions may be used to determine the crosstalk 202 based on crosstalk 201, for instance a function which takes into account the crosstalk from multiple active subscriber lines, data rates at various subscriber lines, historical information on the relation between 201 and 202, etc.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:
1. A device comprising:
an interface to at least one active subscriber line within a network;
an interface to at least one inactive subscriber line, the inactive subscriber line connected to an associated piece of terminating equipment that has not yet performed a handshake operation to the network, the inactive subscriber line remaining inactive until the associated piece of terminating equipment completes the handshake operation;
means for transmitting a first signal on said inactive subscriber line before said inactive subscriber line is initialized via the handshake operation;
means for synchronously measuring crosstalk induced into said active subscriber line by transmitting said first signal on said inactive subscriber line;
means for transmitting a second signal on said active subscriber line;
means for synchronously measuring crosstalk induced into said inactive subscriber line by transmitting said second signal on said active subscriber line; and means for mitigating the measured crosstalk induced into said inactive subscriber line and said active subscriber line by reducing bitloading on said active subscriber line before the inactive subscriber line is initiated with the network via the handshake operation such that upon the initiation of the inactive subscriber line the crosstalk induced into said active subscriber line is less than the measured crosstalk induced during transmission of the first signal.

2. The device according to claim 1, wherein said means for transmitting a signal is configured to transmit a low-power signal.

3. The device according to claim 1, further comprising means for measuring crosstalk induced into said inactive subscriber line by transmission of at least a second signal on said at least one active subscriber line.

4. The device according to claim 1, further comprising means for estimating crosstalk induced into said inactive subscriber line based on said crosstalk induced into said active subscriber line by said inactive subscriber line.

5. The device according to claim 1, further comprising means for updating information related to said crosstalk induced by said inactive subscriber line into said active subscriber line or vice versa over time.

6. The device according to claim 1, wherein said device is integrated in a Digital Subscriber Line Access Multiplexer (DSLAM).

7. The device according to claim 1, wherein said device is integrated in a Network Analyzer.

8. A method for use in a device including an interface to at least one active subscriber line within a network and an interface to at least one inactive subscriber line, the inactive subscriber line connected to an associated piece of terminating equipment that has not yet performed a handshake operation to the network, the inactive subscriber line remaining inactive until the associated piece of terminating equipment completes the handshake operation, said method comprising:

transmitting a first signal on said inactive subscriber line before said inactive subscriber line is initialized via the handshake operation;

synchronously measuring crosstalk induced into said active subscriber line by transmitting said first signal on said inactive subscriber line;

transmitting a second signal on said active subscriber line;

synchronously measuring crosstalk induced into said inactive subscriber line by transmitting said second signal on said active subscriber line; and mitigating the measured crosstalk induced into said inactive subscriber line and said active subscriber line by reducing bitloading on said active subscriber line before the inactive subscriber line is initiated with the network via the handshake operation such that upon the initiation of the inactive subscriber line the crosstalk induced into said active subscriber line is less than the measured crosstalk induced during transmission of the first signal.

* * * * *